United States Patent [19]

Koop et al.

[11] Patent Number: 5,026,110
[45] Date of Patent: Jun. 25, 1991

[54] CONVERTIBLE TOP FOR MOTOR VEHICLES

[75] Inventors: Georg Koop, Plattling; Raimund Völkl, Deggendorf, both of Fed. Rep. of Germany

[73] Assignee: ED Scharwächter GmbH & Co. KG, Remscheid, Fed. Rep. of Germany

[21] Appl. No.: 517,760

[22] Filed: May 2, 1990

[30] Foreign Application Priority Data

May 3, 1989 [DE] Fed. Rep. of Germany ....... 3914638

[51] Int. Cl.$^5$ .............................................. B60J 7/00
[52] U.S. Cl. ..................................... 296/108; 296/122
[58] Field of Search ...................... 296/108, 107, 120.1, 296/121, 122, 116, 117

[56] References Cited

U.S. PATENT DOCUMENTS

| | | | |
|---|---|---|---|
| 3,453,021 | 7/1969 | Adamski | 296/117 |
| 4,840,421 | 6/1989 | Hennessy | 296/117 |
| 4,854,634 | 8/1989 | Shiraishi | 296/117 |
| 4,936,626 | 6/1990 | Gimeiner et al. | 296/108 |
| 4,948,194 | 8/1990 | Dogliani | 296/120.1 |

*Primary Examiner*—Robert R. Song
*Attorney, Agent, or Firm*—Toren, McGeady & Associates

[57] ABSTRACT

A collapsible convertible top or roof for motor vehicles has a linkage system including a front roof frame, a rear roof frame, a main roof arch, a two-part retaining rod supporting the roof arch against a tension bracket, and a linkage for displacing the roof frames and parts of the retaining rod between an extended position and a collapsed position. To assure stability of the linkage system with the convertible top in the extended or closed position, a locking mechanism is provided including a pivotal locking bar displaceable between a locked position and a released position by an actuating lever moved in accordance with the operation of the convertible top or roof. The actuating lever is mounted on one of two cooperating parts and pivots about an axis parallel to an articulation axis of the parts. A catch cooperates with the locking bar for securing the extended position.

22 Claims, 3 Drawing Sheets

CONVERTIBLE TOP FOR MOTOR VEHICLES

BACKGROUND OF THE INVENTION

The present invention is directed to a convertible top or roof for motor vehicles having a linkage system including a front roof frame, a rear roof frame, a main roof arch and a two-part retaining rod supporting the main roof arch against a tension bracket. The two parts or halves of the retaining rod along with the front and rear roof frames are displaced into an extended position by a linkage for placing the top in the extended or closed position and for securing it in that position.

In convertible tops for motor vehicles, it is necessary to lock the interengaged articulated parts of the linkage system in position relative to one another, particularly the parts or sections connected so that they can pivot relative to one another when collapsing or folding the top into the open position. The two parts can be the front roof frame and the rear roof frame, as well as the two interconnected parts of the retaining rod connecting the main roof arch to the tension bracket, whereby such parts are locked relative to one another in the extended position defining the closed position of the collapsible top and such locking is effected in known designs of convertible tops by providing an over dead center position of the articulated interconnected parts along with respective guidance and actuating devices. This known manner of locking interconnected articulated linkage parts of collapsible convertible tops requires a complicated and expensive design of the linkage system for the folding top and is subject to the disadvantage that linkage parts bridging great distances can buckle across the extended position resulting in some instability, particularly in motor-driven convertible tops. Moreover, a stronger design of the drive for the collapsible top is necessary to overcome the required over dead center position of the various combination of parts and this results in a further increase in the over-all cost of the folding top.

SUMMARY OF THE INVENTION

Therefore, the primary object of the present invention is to provide a locking system for collapsible convertible tops or roofs of motor vehicles, especially for motor-driven folding tops. The locking system can be produced and assembled at a low cost, whereby the parts of the linkage system which pivot relative to one another can be locked in the extended position or other position corresponding to the closed position of the top. Such a locking system can be used on all hinge or pivotal joints between linkage system parts of a folding convertible top.

In accordance with the present invention, the locking system for the linkage system parts of the folding top can be pivoted relative to one another, in particular the front roof frame and the rear roof frame and the two halves or parts of the retaining rod in their extended positions. The locking action is afforded by a pivotal locking bar which can be adjusted between a locked position and a released position by an actuating lever that moves according to the operation of the convertible top and works in combination with a catch where the locking bar is mounted on one of the parts and the catch on the other part. The locking bar can pivot about an axis parallel to the mutual articulation axis of the parts.

The mutual locking of the parts of the linkage system in a collapsible convertible top which can pivot relative to one another can be afforded at a low cost with regard to both production and assembly costs and can be accommodated in a very small space avoiding any unwanted increase in the space required for the linkage system. Furthermore, the locking system according to the invention, assures a positively rigid connection of the interconnected articulated parts of the linkage system in their respective positions so that even with linkage sections, which are cantilevered over great distances, there can be no buckling or collapse. Finally, another advantage of the locking system, according to the present invention, is that it is excellently suited for use with motor-driven folding tops.

In a preferred embodiment, the pivotal locking bar is formed as a two-armed lever and is mounted so that it rotates freely on one of the two articulated parts and an actuating lever is arranged so that it can pivot about a parallel axis for the part on which the locking bar is mounted, and the actuated lever is, in turn, provided with an engaging stop positioned so that there is enough free space for the adjustment moving of the locking bar. The locking bar is positioned in a recess in one of the parts running across its longitudinal extent for assuring the least possible size of the locking system. Furthermore, the stop is designed as a simple engaging stop on the part to which the actuating lever is mounted.

In a particularly simple arrangement of the locking system, according to the present invention, the pivotal locking bar may be combined as one part with the actuating lever and the engaging stop for the adjustable linkage part is formed as a cantilevered bracket rigidly connected to the part. Furthermore, the engaging stop which leaves enough free space for the actuating lever may be provided with an elongated hole in the cantilevered bracket as a stationary mount on the linkage part.

In a further preferred embodiment of the invention, the actuating lever is provided as a part separate from the pivotal locking bar and it can be mounted on the same linkage part on which the locking bar is provided.

With regard to the present invention, the engaging stop for the actuating lever can be arranged in a number of different ways. For instance, the engagement stop for the actuating lever may be in the form of a V-shaped recess in a cantilevered bracket intended as a rigid mount with the linkage part on which it is mounted or in the rigid part itself.

Concerning the interaction of the actuating lever and the pivotal locking bar, in a preferred arrangement, the actuating lever interacts with the locking bar by an engagement member, such as an engaging lug.

The drive for the actuating lever, especially for manually collapsible folding tops, can be provided by an engaging and disengaging lever and a tension cable, or for motor-driven folding tops, it can be provided by having the actuating device of the folding top, such as the connecting rods or actuating cylinders, act on the actuating lever for the pivotal locking bar. In particular, it is possible to provide an arrangement wherein the actuating device of the collapsible top acting on the actuating lever, especially a connecting rod or actuating cylinder, passes through an elongated hole in the cantilevered lever so that, at the same time, there is a movement of the actuating lever resulting in an adjusting drive for the corresponding linkage part after a certain distance which is sufficient to disengage the pivotal locking bar.

In another embodiment of the invention, the pivotal locking bar is provided with a loading spring acting in its engaged position. The spring is a helical spring supported against a solid support on the linkage part on which the locking bar is mounted. Alternatively, it may be provided as a leg spring and supported on one leg of the linkage part, carrying the swivel locking bar, while it acts on the other leg of the lever arm of the pivotal locking bar cooperating with the actuating lever.

In such an embodiment, the two lever arms of the locking bar are positioned approximately at right angles to one another.

In a particularly preferred embodiment of the locking system of the present invention, with regard to the retaining rod, the axis of the locking bar is offset in the height direction relative to the mutual articulation axis of the two linkage parts, so that the parts can pivot relative to one another. The offset is such that the stop notch for the pivotal locking bar is formed by a stop on the free end of the other linkage part.

The stop notch for the pivotal locking bar can also be formed by a radial recess in a disk formed on one side of the other linkage part. Depending on the given conditions, especially for the path of the linkage system, the stop notch for the pivotal locking bar can be formed by a radially projecting lug on a disk positioned on one side of the other linkage part.

To prevent the parts of the roof frames from overrunning the extended position, it is possible to provide a stop defining the extended position of the two parts located on one of the parts pivotal relative to the other, whereby the stop reaches over or under the free end of the other part.

Finally, in another embodiment of the invention, for certain relatively pivotal parts, especially parts of the roof frame, the pivotal locking bar can be arranged to interact with a catch on one of the parts by means of a locking element mounted on the other part so that it can slide parallel to the long axis of the locking bar.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
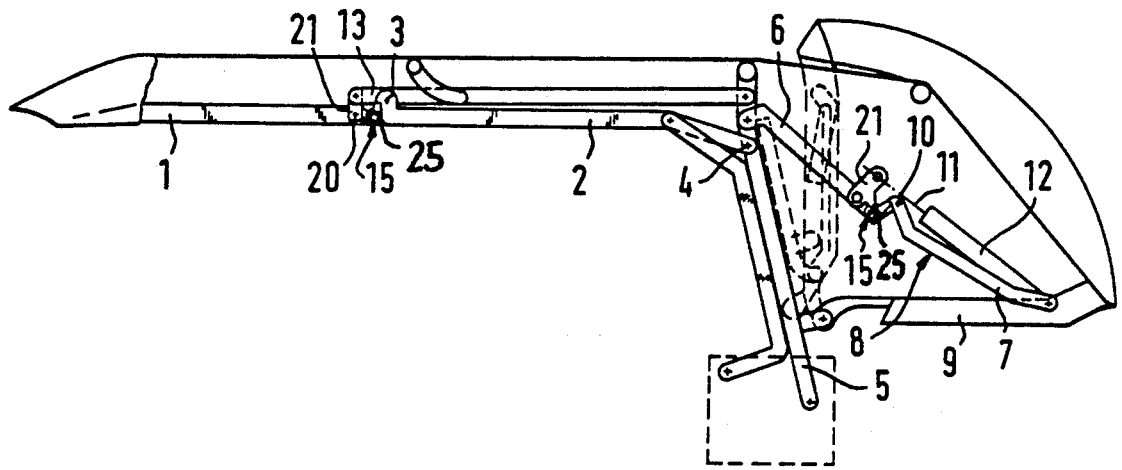
FIG. 1 is a schematic view of a motor-driven collapsible convertible top for motor vehicles, driven by a piston cylinder.
Figure 2:
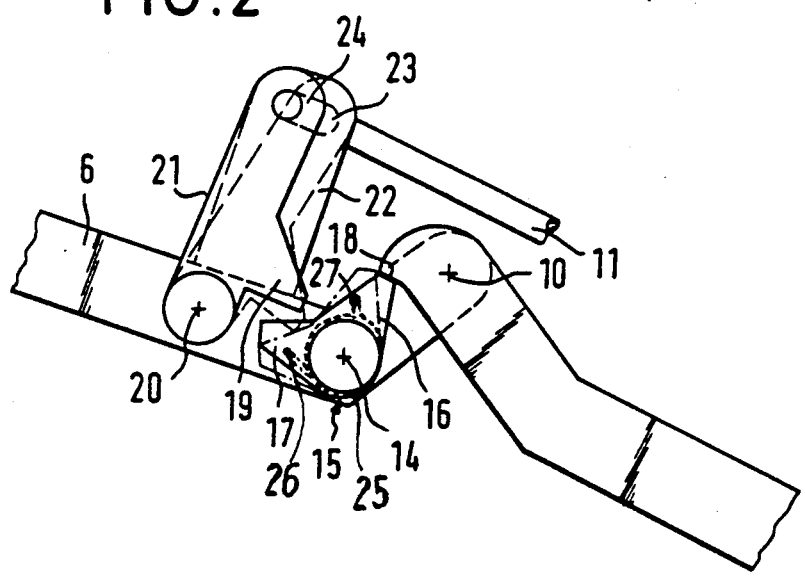
FIG. 2 illustrates a locking mechanism for the retaining rod of FIG. 1, displayed on an enlarged scale.

In a motor-driven collapsible convertible top or roof for motor vehicles, a front roof frame 1 and a rear roof frame 2 are interconnected so that they can pivot about an articulation axis extending transversely of the direction of travel of the vehicle. The rear roof frame 2 is pivotally connected to a main roof arch 5 for pivotal displacement about an axis 4 extending transversely of the travel direction. Main roof arch 5 is supported against a tension bracket 9 by a retaining rod 8 made up of two articulated parts 6, 7 so that the parts are pivotally displaceable about an axis 10, extending transversely of the direction of travel. The drive for displacing the collapsible folding top includes a piston cylinder 12 having a piston rod 11 acting on the retaining rod 8 with its driving movement transmitted from the main roof arch 5 to the front roof frame 1 by a linkage or connecting rod 13. With the pivotal interconnection of the parts of the retaining rod 8, shown in FIG. 2, the pivot or articulation axis 10 connecting the two parts 6, 7 is mounted upwardly from the parts 6 and 7 in the extended position and a two-armed pivotal locking bar 15 is connected to one part 6 for pivotal movement about an axis 14 spaced from and parallel to the articulation axis 10. The lever arms 16, 17 of the locking bar 15 are arranged approximately at right angles to one another. Lever arm 16 has a stop 18 for engagement with a stop notch on a free end of part 7. The other lever arm 17 cooperates with an engaging lug 19 on an actuating lever 21 mounted on part 6 for pivotal movement about an axis 20 parallel to and spaced from the pivotal axis 14 of locking bar 15. Piston rod 11 of piston cylinder 12 acts on a free end of actuating lever 21. Furthermore, a bracket 22 formed integrally with part 6 and cantilevered therefrom cooperates with the actuating lever 21 and has an elongated hole 24 extending transversely of the axis 20. The hole 24 forms an engagement stop 23 and the piston rod 11 is movable within the hole. Elongated hole 24 is sized so that piston rod 11 of piston cylinder 12 acts directly on part 6 by way of the cantilevered bracket 22 after displacement of the actuating lever 21 over a distance for effecting the disengagement of locking bar 15, so that the retaining rod 8 collapses. Pivotal locking bar 15 is acted on by a leg spring 25 acting in the engagement direction so that the leg spring is supported on part 6 by one of its legs 26 and acts via its other leg 27 on arm 16 of the locking bar provided for the actuating lever 21.

Figure 3:
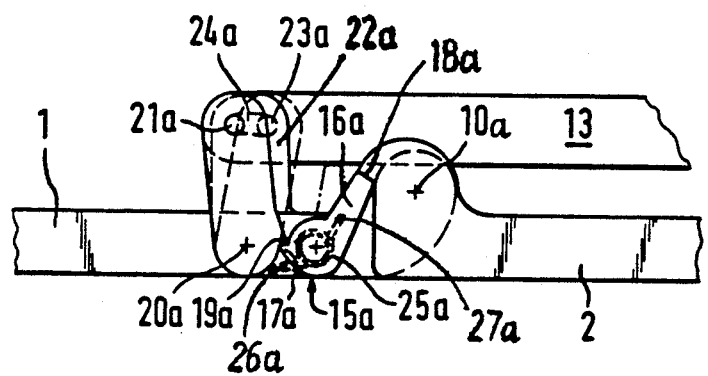
FIG. 3 displays a locking mechanism for two halves of a roof frame in an enlarged view.

In FIG. 3, the articulation between the front roof frame 1 and the rear roof frame 2 is shown with displacement of the frames being effected around the axis 10a extending transversely of the plane of the frames 1 and 2 in the extended position. The axis 10a is offset upwardly, as shown in FIG. 3, from the frame 2, and the frame 2 has a stop 18a acting as a stop notch on a free end of frame 2, with which lever arm 16a of the pivotal locking bar 15a interacts. The other lever arm 17a of locking bar 15a cooperates with an engaging lug 19a on actuating lever 21a and, in turn, the actuating lever 21a is mounted on the front roof frame 1 for pivotal movement about an axis 20a. An upper end of actuating lever 21a is interconnected with the connecting rod 13. Further, actuating lever 21a has a cantilevered bracket 22a formed integrally with the front roof frame 1 and the bracket has an elongated hole 24a with the elongated direction extending transversely of the axis 20a. The elongated hole 24a forms an engaging stop 23a. Pivotal locking bar 15a is acted on in the locking direction by a leg spring 25a with legs 26a, 27a arranged similar to leg spring 25 and legs 26, 27 in FIG. 2.

Figure 5:
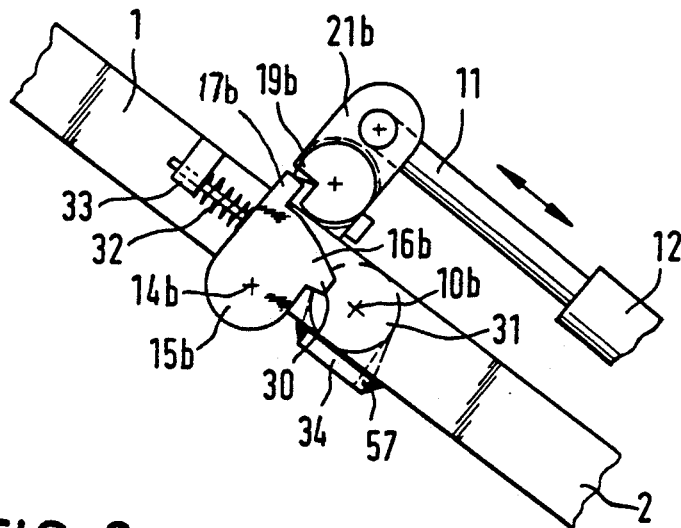
FIG. 5 illustrates a further embodiment of the locking mechanism for the two halves of the roof frame on an enlarged scale.

In FIG. 5, a pivotal connection between front roof frame 1 and rear roof frame 2 is shown with pivotal movement provided by articulated axis 10b with the axis extending through the plane of the frames 1 and 2 in the extended position as shown. Pivotal locking bar 15b is mounted on front roof frame 1 for pivotal movement about axis 14b spaced below articulation axis 10b. Locking bar 15b, by way of its lever arm 17b, acts together with a recess in actuating lever 21b, forming an engaging lug 19b, with its other lever arm 16b acting with a catch formed by a radial recess 30 in a disk 31 secured on the rear roof frame 2. In this illustrated example, locking bar 15b is loaded or biased by a helical spring 32 with the spring supported on one end against a solid support 33 on front roof frame 1 and at the other end bearing against lever arm 17b of the locking bar 15b acting on the actuating lever 21b. The free mobility of actuating lever 21b for the adjustment of the locking bar 15b, is limited by a stop formed by the solid support 33. In addition, the mutual pivotal displacement of the frames 1, 2 is limited by a stop 34.

Figure 6:
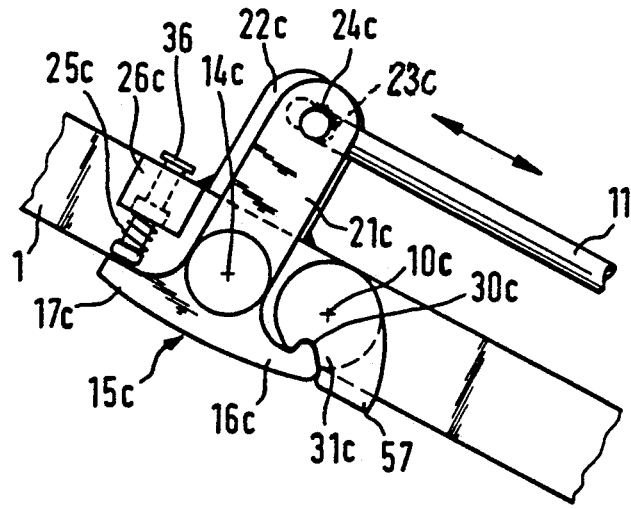
FIG. 6 displays still another embodiment of the locking mechanism for the two halves of the roof frame shown on an enlarged scale.
Figure 7:
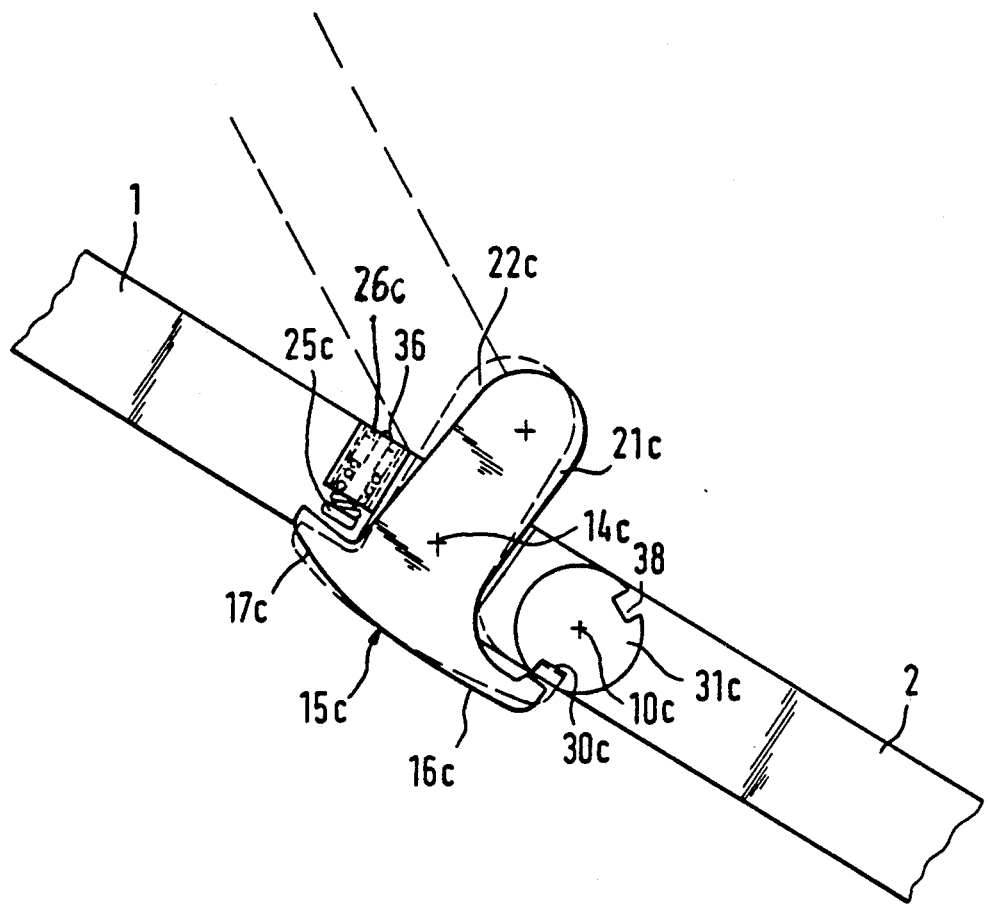
FIG. 7 is a further embodiment of the locking mechanism for two halves of the roof frame set forth on an enlarged scale.
Figure 8:
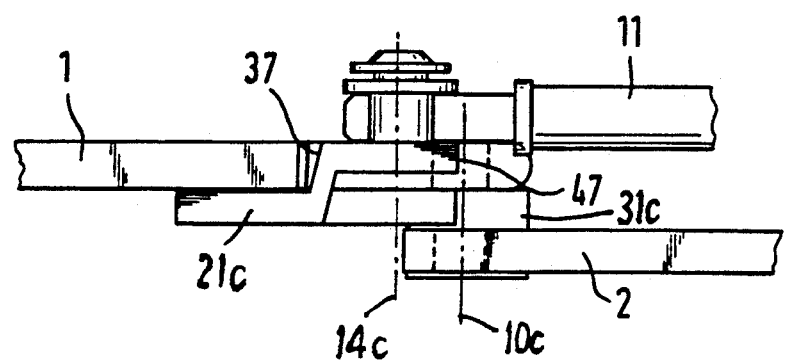
FIG. 8 is a top view of the locking mechanism set forth in FIG. 7.

In the arrangement shown in FIGS. 6 to 8, the articulation between front roof frame 1 and rear roof frame 2 is provided by articulation axis 10c located between the two frames extending through the frames in the plane of the extended position with a bearing axis 14c of pivotal locking bar 15c located approximately in the plane of the extended position of the roof frames 1, 2. Locking bar 15c is formed integrally with actuating lever 21c. A cantilevered bracket 22c, formed integrally with the front roof frame 1, cooperates with actuating lever 21c and at the upper end, as viewed in FIG. 6, the bracket 22c has a hole 24 elongated transversely of the direction of the axis 14c and forms an engaging stop 23. Piston rod 11 of the piston cylinder 12 engages actuating lever 21c and the elongated hole 24c of bracket 22c by passing through the elongated hole. The lever arm 16c of locking bar 15c acts on a disk 31c connected to the rear roof frame 2 and the other lever arm 17c, biased by a compression spring or helical spring 25c, acts on the front roof frame 1. Helical spring 25c is supported at one end against a solid abutment 26c on the front roof frame 1, and a screw 36 affords adjustment for the abutment 26c. As shown best in FIG. 8, in conjunction with the locking arrangement of the present invention, locking bar 15 or 15b or 15c can be located in a transverse recess in the front roofing part 1 or part 6 of the retaining bar 8 for providing a particularly space-saving arrangement. Actuating lever 21 or 21c is, in turn, provided with a recess and is limited in its free mobility by edges 47 of a V-shaped recess 37 in the front roof frame 1 or part 6. In the examples shown in FIGS. 5 and 6, an additional stop 57 is provided on the rear roof part 2, and the other part 7 of the retaining rod 8, while in the embodiment illustrated in FIG. 7, a second catch 38 is formed by a radial recess.

Figure 4:
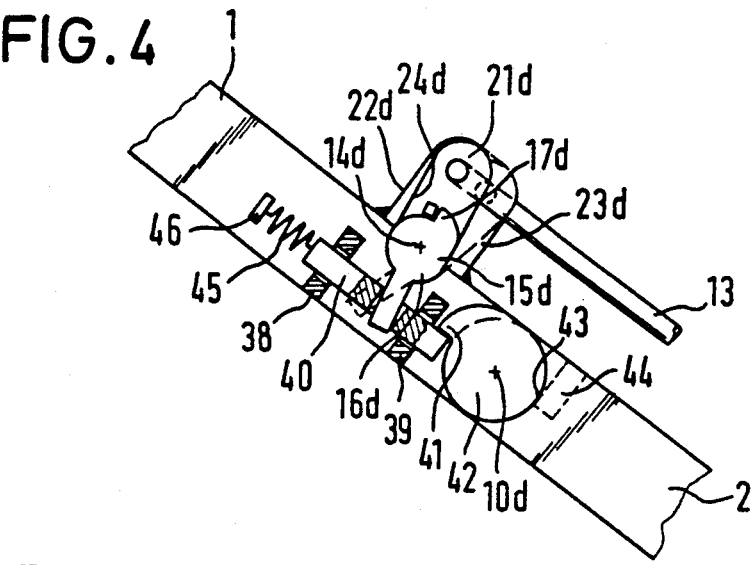
FIG. 4 is another embodiment of the locking mechanism for two halves of a roof frame set forth in an enlarged scale.

In FIG. 4, the front and rear roof parts 1, 2 are interconnected for pivotal displacement about an axis 10d extending transversely of the plane of the extended position of the frames and a pivotal locking bar 15d is mounted on front roof frame 1 for pivotal movement about an axis 14d, offset from and parallel to the articulation axis 10d. Pivotal locking bar 15d has two oppositely extending lever arms 16d, 17d and acts by the lever arm 17d in cooperation with actuating lever 21d for pivotal movement on front roof frame 1. Actuating lever 21d is arranged in a V-shaped recess 24d forming an engaging stop 23d in a cantilevered bracket 22d constructed integrally with the front roofing frame 1. A piston rod 11 or a connecting rod 13, as shown in FIG. 4, acts on an upper end of actuating lever 21d so that the lever can be displaced in accordance with the operation of the convertible top. Pivotal locking bar 15d acts along with a locking part 40 guided in guides 38, 39, on front roof frame 1, so that it is parallel to the lever arm, and a radial projection 41 on disk 42 acts as a catch on the rear roofing frame 2. Disk 42, as shown in FIG. 4, has a second radial projection 43 bearing against a solid abutment 44 on the rear roofing frame 2, when the frames 1, 2 are in the extended position. Locking part 40, as shown in FIG. 4, is acted on by a compression spring in the form of a helical spring 45 for effecting engagement with the helical spring 45 supported against an abutment 46 in a stationary position on the front roofing frame 1.

While specific embodiments of the invention have been shown and described in detail to illustrate the application of the inventive principles, it will be understood that the invention may be embodied otherwise without departing from such principles.

We claim:

1. Collapsible convertible top for motor vehicles movable between an extended or closed position and a collapsed or open position, including a front roof frame, a rear roof frame, a main roof arch and a linkage system, said linkage system comprising a two-part retaining rod supporting said main roof arch against a tension bracket, the two parts of said retaining rod being displaceable together with said front and rear roof frames by a linkage into an extended position and being secured in the extended position, wherein the improvement comprises a mechanism for locking in the extended position at least one of said front roof frame and rear roof frame and said parts of said retaining rod, said front and rear roof frames and said parts of said retaining rod being pivotally displaceable relative to one another each about an articulation axis (10) in the extended position, said locking mechanism comprising a pivotally movable locking bar (15), an actuating lever (21) movable in accordance with operation of said convertible top between an engaged position and a released position for securing said convertible top in the extended or closed position, and said locking bar being pivotally mounted on and about an axis (14) in said front roof frames (1) and one of said parts (6) of said retaining rod with said locking bar pivotal axis (14) being in spaced parallel relation to the corresponding articulation axis (10), and means (18) on said rear roof frame (7) and another said parts (7) of said retaining rod for cooperation with said locking bar for maintaining the extended or closed position.

2. Collapsible convertible top, as set forth in claim 1, wherein said locking bar (15) is a two-armed lever and is mounted for free rotation on said front roof frames (1).

3. Collapsible convertible top, as set forth in claim 2, wherein said actuating lever (21) is mounted on at least one of said first roof frame (1) and the one said part (6) of said retaining rod for cooperation with said locking bar (15) and said actuating lever is pivotally displaceable about an axis (20) parallel to said articulation axis (10), and said actuating lever has an engaging stop (23) affording sufficient free space for movement of said locking bar (15).

4. Collapsible convertible top, as set forth in claim 1, wherein said locking bar (15) is positioned in a recess (37) located in at least one of said front roof frame (1) and the one of said parts (6) of said retaining rod with said recess extending across the longitudinal extent thereof.

5. Collapsible convertible top, as set forth in claim 3, wherein a stop arrangement is located on at least one of said front roof frame (1) and the one said part (6) of said connecting rod on which said actuating lever (21) is mounted.

6. Collapsible convertible top, as set forth in claim 1, wherein said locking bar (15c) is formed integrally with said actuating lever (21c) and an engaging stop (23c) is formed as a rigid part of a cantilevered bracket (22c) formed on said rear roof frame (2) and the another said part (7) of said retaining rod.

7. Collapsible convertible top, as set forth in claim 6, wherein said engaging stop (23c) affords free space for said actuating lever (21c) by means of an elongated hole (24c) extending transversely of the articulation axis (10) and located in said cantilevered bracket (22c) secured to said front roof frame (1).

8. Collapsible convertible top, as set forth in claim 5, wherein said actuating lever (21) is separate from said locking bar (15) and is mounted on at least one of said front roof frame (1) and the one said part (6) of said retaining rod on which said locking bar (15) is mounted.

9. Collapsible convertible top, as set forth in claim 4, wherein said recess (37) for said actuating lever (21c) is formed as a V-shaped recess in a cantilevered bracket (22c) rigidly connected with at least one of said front roof frame (1) and the one said part (6) of said retaining rod.

10. Collapsible convertible top, as set forth in claim 3, wherein said actuating lever (21) acts together with said locking bar (15) by means of an engaging lug (19) on said actuating lever.

11. Collapsible convertible top, as set forth in claim 3, wherein means (12, 13) for operating said collapsible top acts on said actuating lever (21) for said locking bar (15).

12. Collapsible convertible top, as set forth in claim 11, wherein said means comprises one of a connecting rod (13) and an actuating piston cylinder (12) and extends through and engages an elongated hole (24) in a cantilevered bracket (22) so that movement of said actuating lever (21) after a certain displacement sufficient to disengage said locking bar (15) results in a drive for at least one of said front roof frames (1) and the one part (6) of said retaining rod.

13. Collapsible convertible top, as set forth in claim 1, wherein a spring (25) acts on said locking bar (15) in the engaged position thereof.

14. Collapsible convertible top, as set forth in claim 13, wherein said spring comprises a helical spring (45) and is supported at one end against a solid abutment (46) on at least one of the said front roof frame (1) and the part (6) of said retaining rod on which said locking bar is mounted.

15. Collapsible convertible top, as set forth in claim 13, wherein said spring for said locking bar is a leg spring (25) and is supported at one leg (26) thereof on at least one of said front roof frame (1) and the one said part (6) of said retaining rod and another leg (27) thereof acts on a lever arm (17) of said locking bar (15) for engagement with said actuating lever.

16. Collapsible convertible top, as set forth in claim 14, wherein said locking bar has a pair of oppositely directed lever arms (16, 17) approximately at right angles to one another.

17. Collapsible convertible top, as set forth in claim 12, wherein said locking bar (15) has a pivotal axis (14) offset relative to the articulation axis (10) of at least one of the pivotal front roof frame (1, 2) and the one said part (6) of said retaining rod.

18. Collapsible convertible top, as set forth in claim 1, wherein a stop catch (18) is provided for said locking bar (15) formed as a stop on a free end of at least one of the said rear roof frame (2) and the another part (7) of said retaining rod.

19. Collapsible convertible top, as set forth in claim 1, wherein a stop catch (18) for said locking bar (15) is formed by a radial recess (30) in a disk (31) secured on a side of one of at least said rear roof frame (2) and the another part (7) of said retaining rod.

20. Collapsible convertible top, as set forth in claim 1, wherein a stop catch (18) is provided for said locking bar (15) by a radially projecting lug (41) on a disk (42) on a side of at least one of said rear roof frame (2) and the another part (7) of of said retaining rod.

21. Collapsible convertible top, as set forth in claim 1, wherein a stop (33) defines the extended position of at least one of said front and rear roof frames (1, 2) and said parts (6, 7) of said retaining rod and extends one of over and under a free end of the corresponding roof frame and part of said connecting rod for pivotal movement therebetween.

22. Collapsible convertible top, as set forth in claim 1, wherein said locking bar (15) in combination with a catch (41) on at least one of said rear roofing part (2) and the another part (7) of said retaining rod in combination with a locking part (40) mounted on the front roofing frame (1) and the one said part of said retaining rod for sliding movement parallel to the long axis of said locking bar.

* * * * *